Aug. 15, 1961  G. W. McCARTY  2,996,089
SELF-ALIGNING ANTI-SPLINTERING INSERT FOR SHOE OF JIG SAW
Filed Aug. 25, 1960  2 Sheets-Sheet 1

INVENTOR
GEORGE W. McCARTY

BY Leonard Bloom
ATTORNEY

Aug. 15, 1961  G. W. McCARTY  2,996,089
SELF-ALIGNING ANTI-SPLINTERING INSERT FOR SHOE OF JIG SAW
Filed Aug. 25, 1960  2 Sheets-Sheet 2
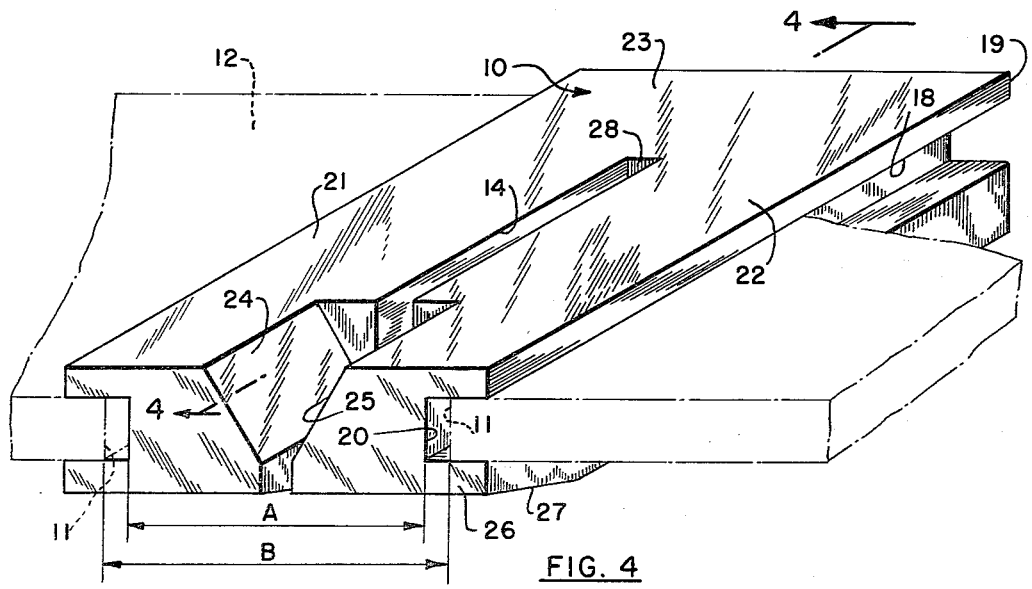
FIG. 3
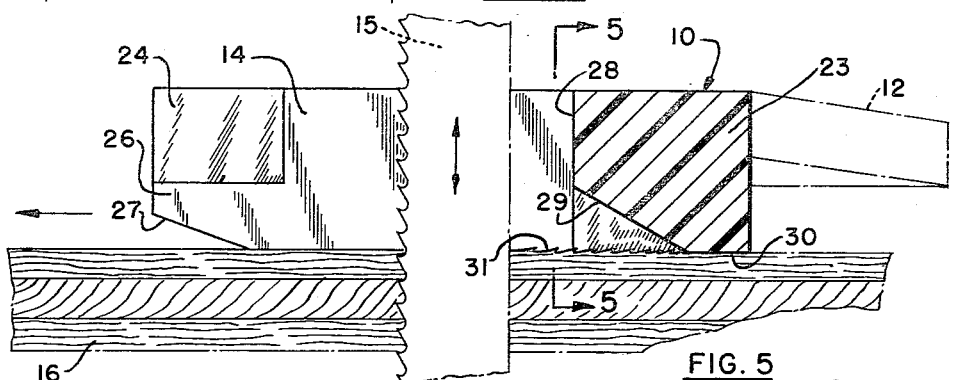
FIG. 4
FIG. 5
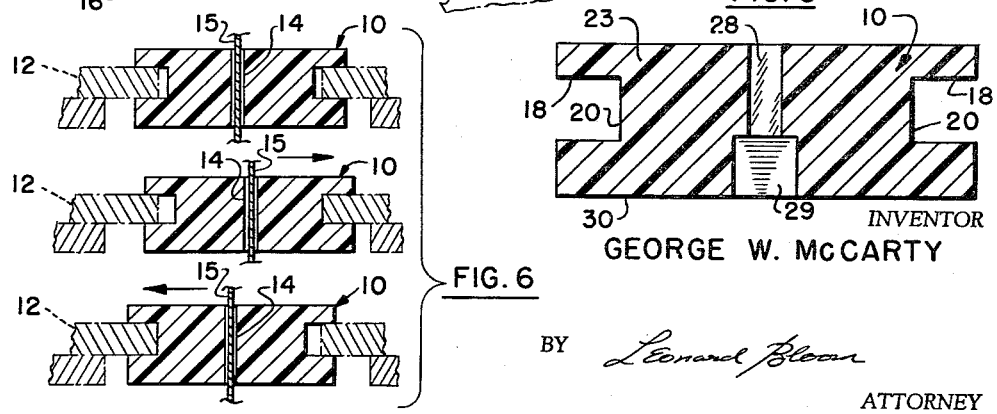
FIG. 6
INVENTOR
GEORGE W. McCARTY
BY Leonard Bloom
ATTORNEY

United States Patent Office 2,996,089
Patented Aug. 15, 1961

2,996,089
SELF-ALIGNING ANTI-SPLINTERING INSERT FOR SHOE OF JIG SAW
George W. McCarty, Timonium, Md., assignor to The Black and Decker Manufacturing Company, Towson, Md., a corporation of Maryland
Filed Aug. 25, 1960, Ser. No. 51,965
1 Claim. (Cl. 143—68)

The present invention relates to an anti-splintering insert for the shoe of a jig saw or similar cutting tool, and more particularly, to such an insert which is made from a suitable anti-friction material and which is self-aligning with respect to the reciprocating saw blade.

In the prior art of which I am aware, jig saws are used to make a variety of cuts, including of course intricate scroll cuts, in various types of wood; and ordinarily, such jig saws are invariably provided with a reciprocating blade and are further provided with a suitable work-engaging shoe. The shoe rests upon the work surface and is provided with a suitable blade opening to allow the reciprocating blade to project therethrough. When it is desired to make a bevel cut at a certain angle, means may be provided to tilt the jig saw (and naturally the blade as well) with respect to the shoe; and hence, in order to accommodate the occasional making of bevel cuts and to eliminate any interference between the blade and the shoe, it is necessary to widen the blade opening in the shoe beyond that which is normally contemplated for straight cuts. Besides, it is difficult to control the alignment of the blade with respect to the blade opening in the shoe without resorting to precision manufacturing procedures, which are of course expensive; thus, sufficient clearance must at all times be provided between the blade and the shoe so as to avoid an undesired accumulation of manufacturing tolerances. However, because of the relatively-large blade opening in the shoe, an insufficient degree of holding support is provided on the top surface of the work at the critical areas directly adjacent to each side of the saw blade kerf. Hence, the top layer of wood fibers will invariably be forced upwardly and thence broken away under the influence of the reciprocating blade on its upward cutting stroke. The result is a ragged series of splinters or chips on the top surface of the work at each side of the saw blade kerf, and the situation is further aggravated when popular woodworking materials such as plywood, are employed.

In order to alleviate this difficulty, the prior art has resorted to the use of anti-splintering inserts to be seated within the blade opening in the conventional shoe (or table) of a jig saw. Such inserts invariably fit quite snugly within the blade opening of the shoe and are provided with a suitable blade guide slot, which allows the reciprocating blade to project therethrough. Other types of inserts may feature a bracket by which the insert is secured to the shoe; and a slot in the bracket, in combination with a mounting screw, accommodates the manual adjustment of the insert with respect to the saw blade. Moreover, anti-splintering inserts of the prior art are universally made of a suitable metal, such as steel or aluminum; and because of either production misalignments, or misalignments generated by virtue of the natural movement of the blade, particularly when making a scroll cut, there quite frequently occurs an interference or "bind" of the blade with respect to the anti-splintering insert. Under such circumstances, and because of the high cutting speeds involved, the blade will quickly become burned or otherwise spoiled.

Therefore, it is an object of the present invention to alleviate these difficulties by providing an anti-splintering insert which is self-aligning with respect to the reciprocating blade, and which has an appreciable lateral play in the plane of the blade opening.

It is a further object of the present invention to provide an anti-splintering insert which is made from a suitable anti-friction material.

It is a still further object of the present invention to provide an anti-splintering insert which may be produced quickly and economically.

These and other objects of the present invention will become apparent from a reading of the foregoing specification, taken in conjunction with the enclosed drawings, in which:

FIGURE 3 is an enlarged perspective view of the insert, showing in phantom lines a portion of the jig saw shoe;

FIGURE 4 is a sectional view taken along lines 4—4 of FIGURE 3;

FIGURE 5 is a sectional view taken along lines 5—5 of FIGURE 4; and

FIGURE 6 is a series of views illustrating the appreciable degrees of lateral play that the anti-splintering insert has with respect to the blade opening of the jig saw shoe.

Figure 1:
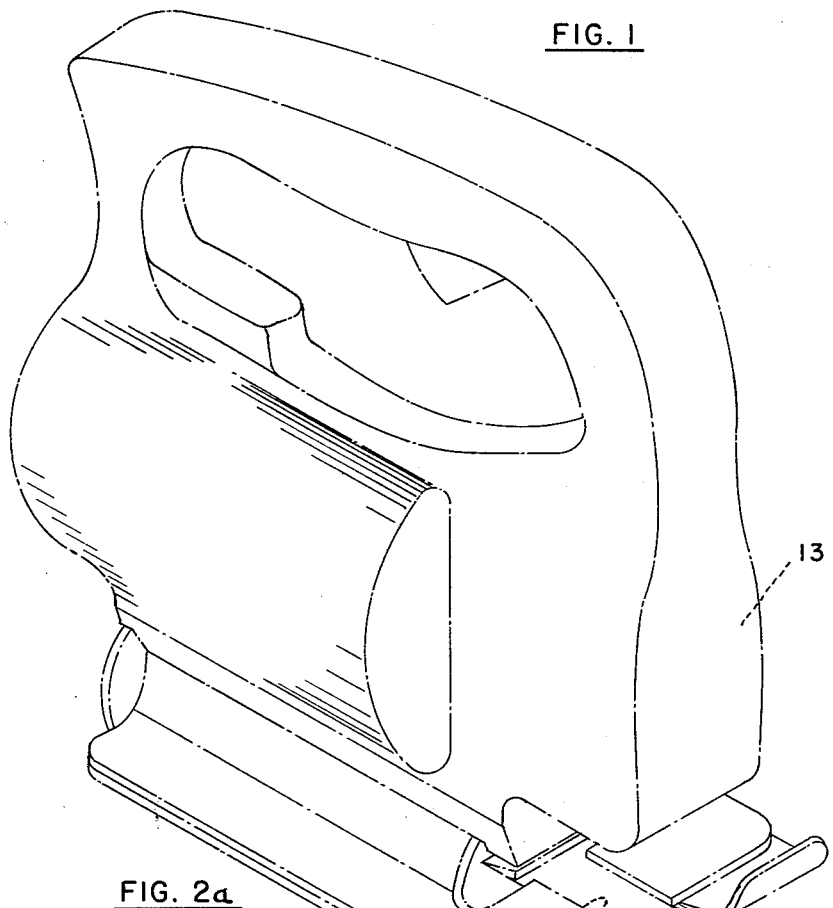
FIGURE 1 is a perspective view of the anti-splintering insert shown in exploded relationship with respect to a typical jig saw, the latter being indicated in phantom.

With reference to FIGURE 1, there is illustrated a suitable anti-splintering insert 10 as it would be applied within the blade opening 11 of the shoe 12 of a typical portable electric jig saw 13. It will be appreciated that the insert 10 is first positioned within the shoe 12; and that the blade is then secured within the jig saw in a manner well-known in the art, such that the blade will fit within the blade guide slot 14 of the insert 10.

Figure 2A:
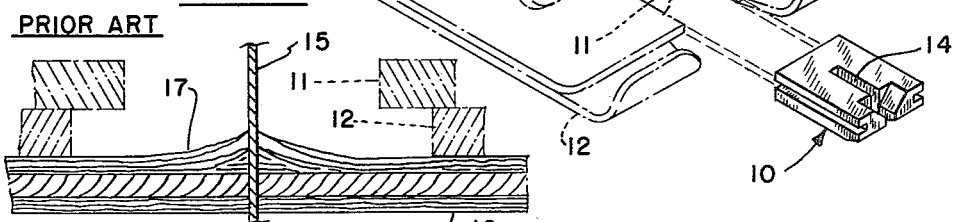
FIGURE 2a is a partial cross-sectional view taken across the shoe of a typical jig saw, such as indicated in FIGURE 1, showing the difficulties that are experienced when making a cut into a typical woodworking material, such as plywood.

With reference to FIGURE 2a, it will be appreciated that in the absence of the anti-splintering insert 10, that a number of splinters, denoted generally by the numeral 17, will be produced as the blade 15 cuts into the work 16. This undesirable situation is especially pronounced if the work 16 is a type of plywood, which incidentally is a favorite type of woodworking material used by home craftsmen.

Figure 2B:
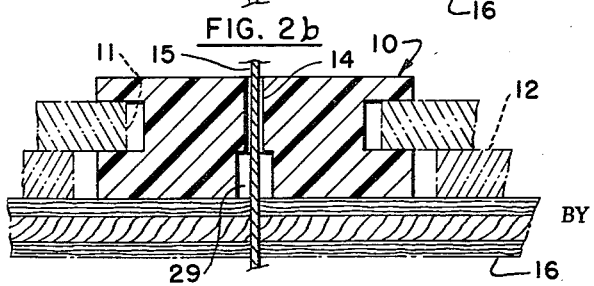
FIGURE 2b is a view similar to that as shown in FIGURE 2a, but showing an insert positioned within the shoe so as to prevent a splintering of the top fibers of the work.

With reference to FIGURE 2b, it will be appreciated that when the anti-splintering insert 10 is positioned within the blade opening 11 of the shoe 12, that a sufficient holding force is provided against the top surface of the work 16 so as to prevent the formation of a series of undesirable splinters 17, as is otherwise illustrated in FIGURE 2a.

With reference to FIGURE 3, the insert 10 is provided with means for sliding it within the blade opening 11 of the shoe 12; such means may take the convenient form (preferably, but not necessarily) of a pair of slotted guideways 18 formed along the outer edges 19 of the insert 10. Moreover, it will be seen from FIGURE 3, that the slotted guideways 18 have a width which is approximately equal to the thickness of the shoe 12 at the blade opening 11, which thus restrains the insert against appreciable movement in a direction which is transverse to the plane of the blade opening 11. Furthermore, the lateral distance in the plane of the insert 10 between the respective guideways 18 may be denoted by the letter "A," while the width of the blade opening 11 of the shoe 12 may be denoted by the letter "B." It will be observed that the dimension A is deliberately chosen so as to be slightly less than the dimension B by an amount, and the result is such that the insert 10 is adapted to have a slight lateral play in the plane of the blade opening 11; and in such a manner, the insert 10 will be allowed to "float" with respect to the blade 15, that is to say, the insert 10 is self-aligning with respect to the blade 15. Moreover, the insert 10 may be molded or otherwise fashioned from a suitable polyamide material, such as nylon, which is an inherent bearing material. The combination of the self-aligning feature of the insert 10, together with the choice of an anti-friction bearing type of material, thus assures that the reciprocating blade 15 will not be burned or otherwise spoiled by an interference with the insert 10.

The insert 10 is generally rectangular in plan outline and comprises a pair of spaced parallel runners 21 and 22, which are joined at their rearmost extremities by a bridge 23, it being noted that the runners 21 and 22 define therebetween the blade guide slot 14. Moreover, a portion of each of the runners 21 and 22 adjacent to the forwardmost portion of the blade guide slot 14 is beveled inwardly towards the blade guide slot 14, as at 24 and 25, thus allowing the conventional chip-disposing air stream to be passed adjacent to the cutting teeth of the reciprocating blade 15.

Moreover, as best illustrated in FIGURE 4, each of the runners 21 and 22 includes a forwardmost toe 26, which has a beveled under surface 27, thus assuring that the insert 10 (when in position) will easily glide along the surface of the work 16. Furthermore, as best illustrated in FIGURES 4 and 5, the blade guide slot 14 terminates in a rearmost wall 28, which includes a portion 29 beveled rearwardly towards the under surface 30 of the insert 10. The purpose of bevel 29 is to smooth down any of the smaller auxiliary splinters (denoted by the numeral 31) which are customarily formed coincident with the kerf of the saw blade 15. This feature of the present invention is supplementary to the main feature of the anti-splintering insert 10 in preventing splinters from being formed along the sides (and generally transverse) to the kerf of the saw blade 15.

With reference to FIGURE 6, there is illustrated the relative degree of appreciable lateral play of the insert 10 in the plane of the blade opening 11, and with respect to the blade 15 and the shoe 12; and in such a manner, the insert 10 is self-aligning with respect to the blade 15.

Obviously, many modifications may be made without departing from the spirit of the present invention; therefore, within the scope of the appended claim, the invention may be practiced other than has been specifically described.

I claim:

In a portable electric jig saw, the combination of a work-engaging shoe including a flat base plate having an opening therein, a pair of ears secured on top of said base plate, one on each side of said opening and each projecting inwardly to partially overlap said opening, said ears having a rectangular blade opening therebetween, a reciprocating blade within said blade opening and disposed perpendicularly with respect to said ears, and a self-aligning anti-splintering insert comprising a single rectangular molded body of polyamide material having a flat top surface and a flat undersurface, said insert comprising a pair of spaced parallel runners having a central blind guide slot formed therebetween for said blade, an integral bridge portion joining said runners rearwardly of said blade guide slot, each of said runners having an outer edge provided with a slotted guideway, said edges and said guideways being parallel to each other, the lateral width across said insert and between said slotted guideways being slightly less than the width of said rectangular blade opening between said ears, said insert being disposed within said shoe such that said ears are received within said slotted guideways in said insert, whereby said insert has a slight lateral play in the plane of said blade opening, said blade being received within said central blade guide slot of said insert, each of said parallel runners having a forwardmost portion adjacent to said blade guide slot beveled inwardly towards said blade guide slot, said forwardmost portions of said runners further having a beveled undersurface, said blade guide slot terminating in a rearmost wall in said bridge portion, said rearmost wall including a portion adjacent said blade guide slot beveled rearwardly and downwardly towards said undersurface of said insert.

References Cited in the file of this patent

UNITED STATES PATENTS

| | | |
|---|---|---|
| 1,272,818 | Lifshitz | July 16, 1918 |
| 2,760,531 | Tommila | Aug. 28, 1956 |
| 2,842,170 | Bruck et al. | July 8, 1958 |